(No Model.) 6 Sheets—Sheet 2.

G. & A. RAYMOND.
REDUCING MACHINE.

No. 387,539. Patented Aug. 7, 1888.

Fig. 2.

Witnesses,
L. F. Maurr
Frederick Goodwin

Inventors,
George Raymond.
Albert Raymond.
By Offield Towle & Phelps
Attys.

(No Model.) 6 Sheets—Sheet 3.

G. & A. RAYMOND.
REDUCING MACHINE.

No. 387,539. Patented Aug. 7, 1888.

Witnesses
L. F. Mann
Frederick G. Goodun

Inventors
George Raymond
Albert Raymond
By Offield Towle & Phelps
Att'ys.

(No Model.) 6 Sheets—Sheet 6.

G. & A. RAYMOND.
REDUCING MACHINE.

No. 387,539. Patented Aug. 7, 1888.

Witnesses,
L. S. Mann.
Frederick G. Goodwin.

Inventors.
George Raymond.
Albert Raymond.
By, Offield Towle & Phelps Atty's.

UNITED STATES PATENT OFFICE.

GEORGE RAYMOND AND ALBERT RAYMOND, OF CHICAGO, ILLINOIS, ASSIGNORS TO THE CYCLONE PULVERIZER COMPANY OF THE UNITED STATES OF AMERICA, OF NEW YORK, N. Y.

REDUCING-MACHINE.

SPECIFICATION forming part of Letters Patent No. 387,539, dated August 7, 1888.

Application filed December 30, 1886. Serial No. 223,026. (No model.) Patented in England January 26, 1887, No. 1,270.

*To all whom it may concern:*

Be it known that we, GEORGE RAYMOND and ALBERT RAYMOND, of Chicago, Illinois, have invented certain new and useful Improvements in Reducing-Machines, (for which we have obtained a patent in Great Britain, No. 1,270, bearing date January 26, 1887,) which we desire to protect by Letters Patent of the United States, and of which the following is a specification.

Our invention relates to machines for reducing ores and other materials by impact and attrition between the fragments; and our invention consists in certain novel features of construction, whereby the working of such machines is greatly improved, as hereinafter described and claimed.

In the drawings annexed, forming a part of this specification.

The general appearance of our improved machine is similar to those patented to us in Letters Patent of the United States, Nos. 293,786 and 293,787, dated February 19, 1884, and is constructed as follows:

Upon two main shafts, 1 and 2, mounted in suitable bearings and driven from pulleys 3 and 4, or by means of other connection with a motive power, are mounted, within the pulverizing-chamber 5, hubs 6 and 7, from which project arms 8, carrying beaters 9. These arms 8, circular in cross-section, are bent to the shape of the beaters, and the direction of their bent portion is determined by the inclination desired to be given to the beaters. Preferably these arms are made in one piece with the hub and of cast-steel; but they may be set into a separately-cast hub, as indicated by the broken lines extending into the hub in Fig. 4. They are made comparatively large near the hub, their large portion being reduced so as to form shoulders, against which the beaters bear when attached.

Figure 4:
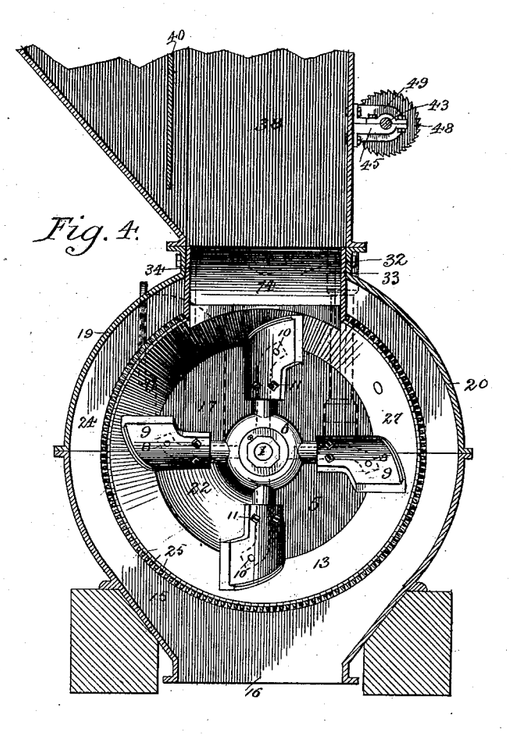
Fig. 4 is a central vertical cross-section of the machine.
Figure 5:
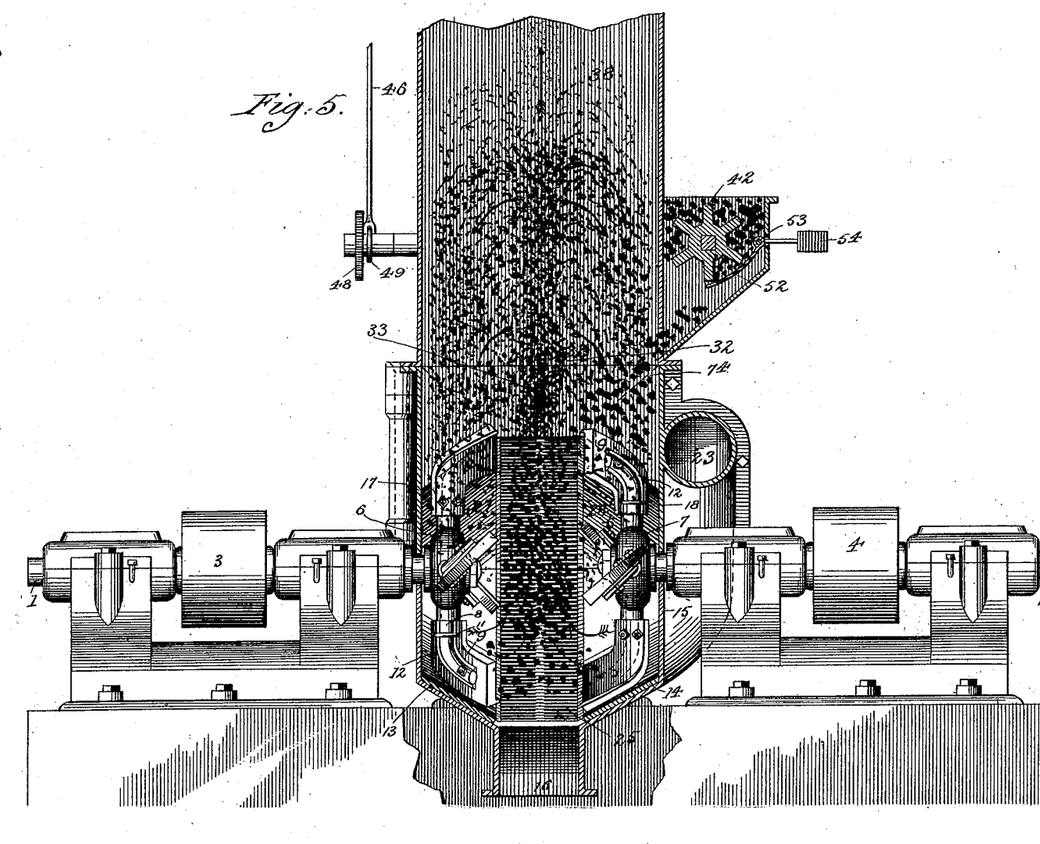
Fig. 5 is a side elevation of the reducing-machine, with its central portion in vertical axial section.

Each beater 9 is channeled, so as to receive the arms 8, and is attached thereto by a bolt, 10, passing through the beater and its respective arm and there fastened by a nut, and also by a clip, 11, embracing the arm, passing on both sides of the same through the beater, and there secured by nuts, as will be clearly seen by reference to Figs. 4 and 5. The beaters are herein shown flat for convenience, and in such form are serviceable; but we prefer the spiral or screw-shaped form shown in our previous patents. This construction enables us to change the beaters when they become worn without disturbing or replacing the hub, and likewise enables us to replace the beaters with others of different shape if for any reason this becomes desirable. This construction, moreover, is cheap, strong, and durable. Ribs 12, Fig. 5, are formed on the beaters, one on each side of the channel, to more securely grasp the arm; but a plain groove or channel may be used, if preferred.

Figure 1:
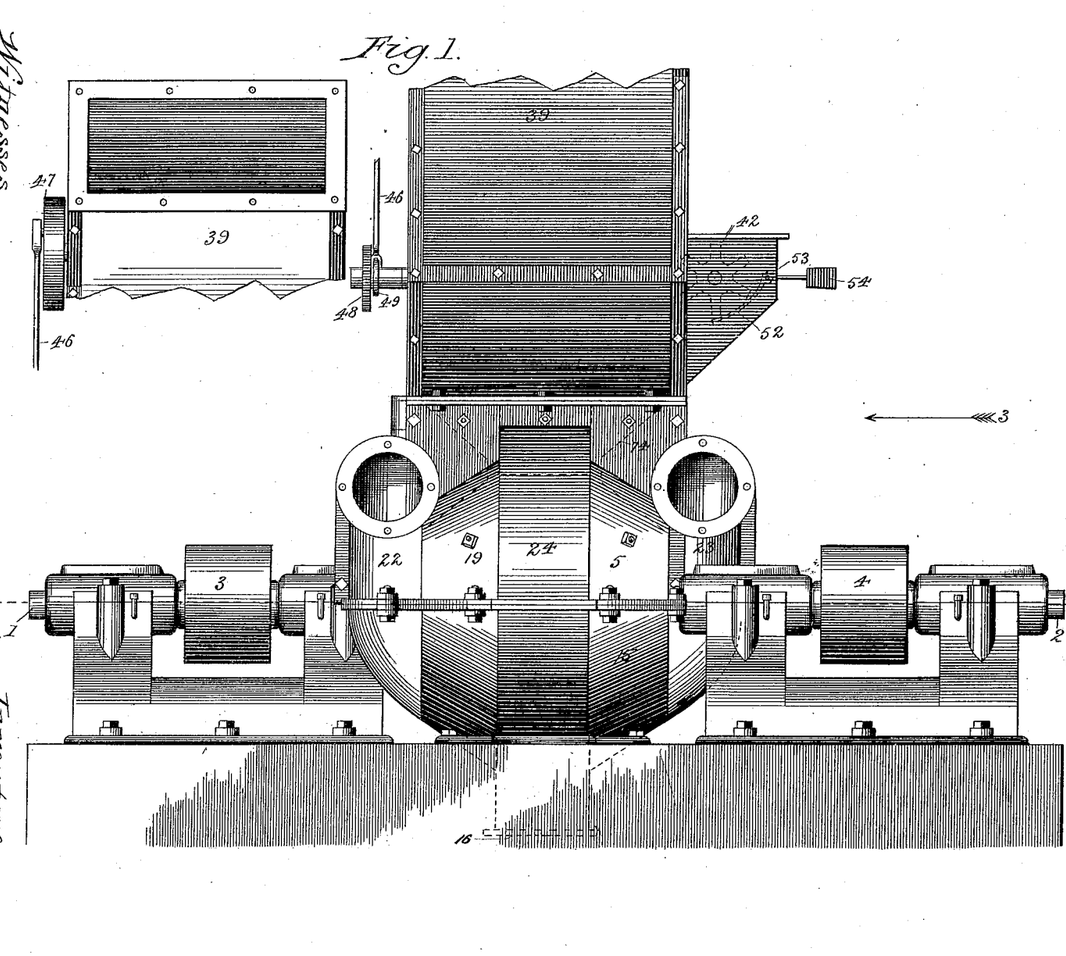
Figure 1 is a side elevation of our improved reducing-machine, a part of the top being represented as broken off and shown on the left hand of the main part of the figure.
Figure 3:
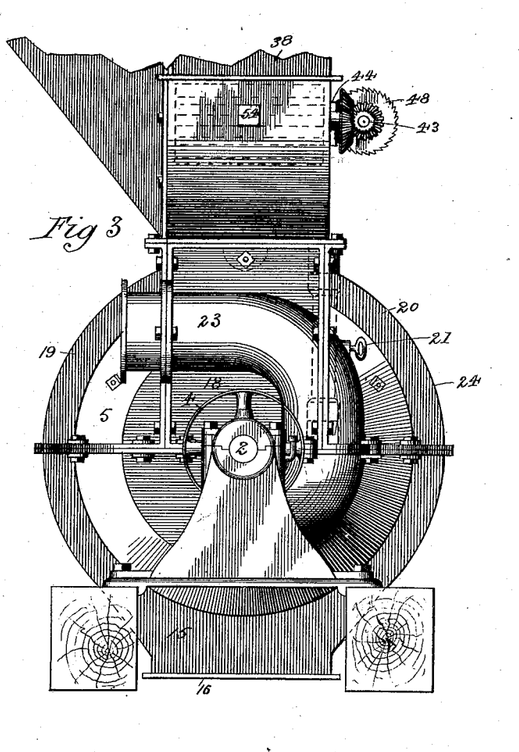
Fig. 3 is an end view of the reducing-machine as it appears when viewed from the position indicated by arrow 3, Fig. 1.

The casing of the pulverizing-chamber is double-cone shaped, and, for convenience, we prefer to cast it in five pieces—viz., a base-piece, 15, provided with a bottom discharge-opening, 16, two end pieces, 17 and 18, and two side pieces, 19 and 20. These several pieces are flanged and ground, so as to fit each other at the joints, and are bolted together, as shown. For convenience it is desirable that one of the side pieces, as 20, should be hinged, as shown in dotted lines, Figs. 3, 4, and 5, so that when its securing-bolts are removed it may be opened to permit access to the interior of the pulverizing-chamber. A handle, 21, Fig. 3, is provided for conveniently pulling out this hinged side. Two currents of air are delivered to opposite ends, respectively, of the pulverizing-chamber, pipes 22 and 23, Fig. 1, being provided for that purpose and forming part of the end and side pieces of the casing. These pipes project toward the same side of the machine, for convenience in attaching pipes thereto, and pass down to diagonally-opposite parts of the pulverizing-chamber near its bottom.

It is desirable that the air should enter at the bottom of the chamber, in order that the beaters and the material operated upon may be between the air as it enters and the passage-way, through which it leaves the chamber, since were the air-pipes otherwise located the air would be too readily and quickly drawn out from the chamber. It is desirable that they should enter at diagonally-opposite parts of the chamber, in order that the beaters, which revolve in opposite directions, may receive the air as they pass down and, sweeping it along the bottom of the chamber, give it the most perfect rotary motion possible.

Figure 2:
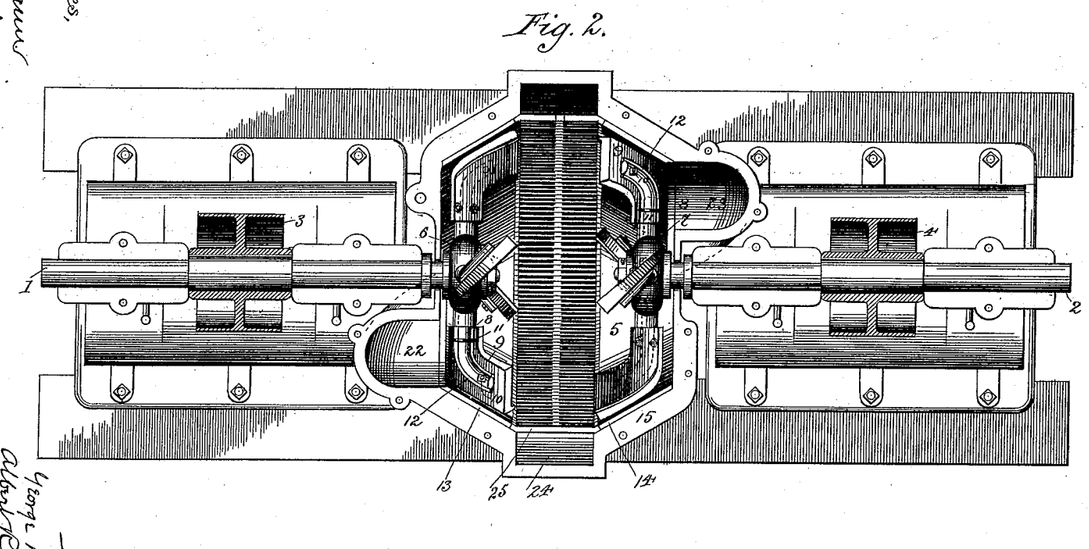
Fig. 2 is a plan view, partly in section, through line 2 2, Fig. 1.

Instead of making the chamber simply double-cone shaped, as heretofore, we propose to introduce a modification which enables us to more readily adapt the machine to grinding with different degrees of fineness, and this modification consists in an annular extension, 24, of the pulverizing-chamber surrounding the latter at its center. The width of this annular extension is approximately equal to the width of the clear space between the free ends of the two sets of beaters within the reducing-chamber, as will hereinafter more fully appear. This annular space is adapted to be put into communication with it by means of the spaces between grate-bars 25, Fig. 9, or to be cut off from it entirely by solid segmental pieces 26, it being understood that the grate-bars are taken out and the solid segmental pieces put in their places when it is desired to cut the annular extension 24 off from the pulverizing-chamber. These grate-bars or segmental pieces are held in position between the edges of two annular strips of lining, preferably of chilled metal, placed about the interior cone-shaped surfaces of the pulverizing-chamber. This lining is in part shown in Figs. 2, 4, and 13, and is made, preferably, in eight parts, two parts, 13 14, Fig. 5, fitting into and corresponding with the interior cone-shaped surface of the bottom piece of the casting 15, four parts, two of which, 27 28, are shown in Fig. 5, corresponding to and fitting the interior curved surfaces of the side top pieces of casing 19 and 20, each of these parts being provided, Fig. 13, with an upwardly-extending flange, 31, lying along the inner face of one of the sides of the upwardly-projecting discharge-openings 32, and two parts, 33 and 34, spanning the gap between the parts 27 and 28, and the other two similar parts (not shown,) respectively just above the annular extension 24. These parts 33 and 34 are attached by bolts passing through slots 29, so that they may be pressed down with greater or less firmness upon the grate-bars, (or solid segments, when the latter are in place,) and may be readily removed when it is desired to replace the grate-bars by the segments, or vice versa.

The grate-bars and segments are made of the shape shown, so as to accurately fit the space left between the adjoining edges of the annular strips of lining and to be held therein, and are inserted, preferably, from the top, one of the readily-removable pieces of lining, 33 or 34, having been taken out for that purpose. These grate-bars are each provided with lugs 35, 36, and 37, Fig. 9, one at each end and one at the center, for holding them at proper distances from each other. The lower edges of the adjustable plates 33 and 34 are beveled, as shown in Fig. 4, so as to give them a bearing upon the bars or segments. The object of these grate-bars and of the annular extension 24 will now be explained.

When it is desired to pulverize to a considerable degree of fineness, the segmental plates are used, completely cutting off the annular extension 24 from the pulverizing-chamber proper; but when it is only desired to comminute the material operated upon to a moderate degree, the grate-bars are inserted, and as fast as the material is reduced sufficiently to pass through the opening between them it enters the chamber 24 and is permitted to pass out through the bottom discharge-opening, 16. During the operation of the machine for fine grinding this opening 16 is closed, and all the material passes up in the form of dust through the top passage-way, 32. When, however, the comminution is moderate, the air-current is not depended upon to carry off the ground product; but it drops down, as stated, by gravity, passing through the grate-bars and out through the opening 16.

The degree of comminution effected by the machine is determined, when the grate-bars are used, by the width of the spaces between them, and a complete machine should be provided with a number of sets of bars adapted to various degrees of comminution. We find it desirable to use the suction-fan and the entire air-passage attachment when the machine is doing coarse work as well as when it is doing fine work. In the former case the increased air-pressure due to the fan assists in holding the material being operated upon up from the bottom of the pulverizing-chamber and between the beaters, where it is most rapidly attacked, and thus very materially increases the capacity of the machine. When so used the material should be allowed to drop into a closed box. The use of the air-blast with the screen has the further advantage that such fine dust as is formed is carried off to the settling-chambers instead of being mingled with the coarser product, as would otherwise be the case, which is also a distinctive advantage.

It will of course be understood that we do not limit ourselves to the use of the machine for coarse grinding with the air-blast, as useful results, though in a minor degree, are obtainable without the air-blast.

When it is desired to change the machine from a condition adapted to coarse grinding to one adapted to fine grinding, instead of replacing the grate-bars by the segmental plates discharge-opening 16 may be merely blocked up, and the annular extension 24 allowed to fill with dust or more or less comminuted particles, which it will speedily do, until the spaces between the grate-bars and the sides of the annular extension are thoroughly packed. The pulverizer will now operate for fine grinding precisely as it would if the annular extension 24 were cut off by the segmental plates, the only disadvantages being the retention in the machine of the material filling the annular extension and the liability of the new material worked upon to become more or less mixed with the old remaining in the machine, which, according to circumstances, may or may not be a disadvantage.

Figures 6, 7, 8, 9, 10, 11, 12, 13:
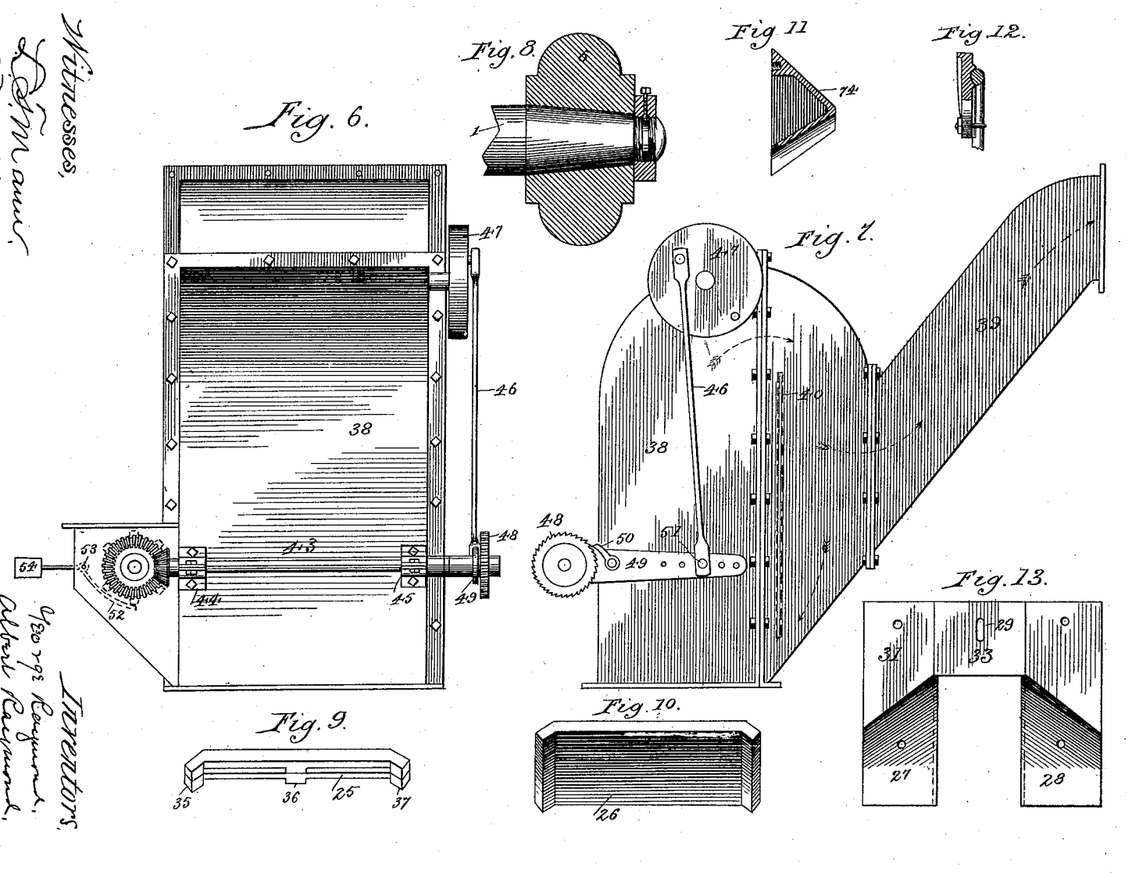
Fig. 6 represents the separating-chamber as it appears when seen from the side opposite to that shown in Fig. 1.
Fig. 7 is a side view of the same.
Figs. 8, 9, and 10 are details on an enlarged scale.
Figs. 11, 12, 13, and 14 are details on the same scale as the other parts of the machine.
Figures 14, 15, 16:
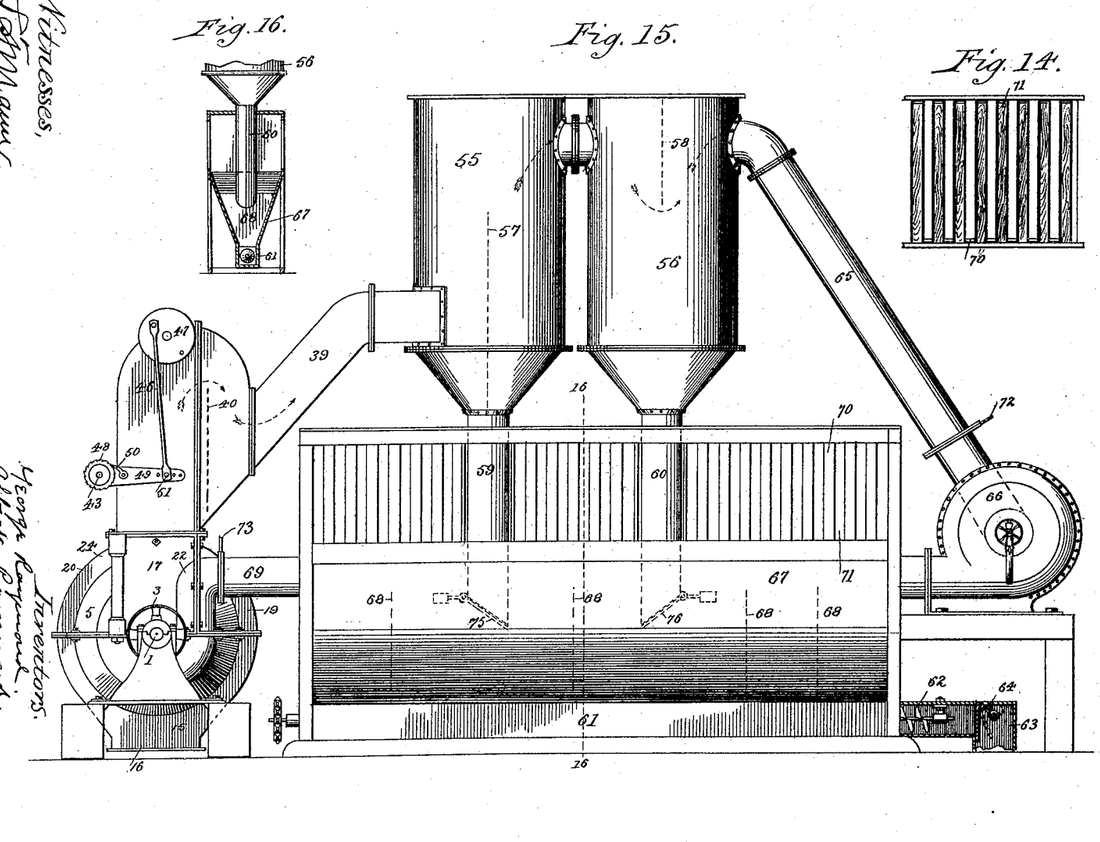
Fig. 15 represents the machine when set up for operation, in connection with a number of auxiliary devices used in putting our invention into practice, a portion of the right-hand lower corner of said figure being in cross-section.
Fig. 16 is a central vertical section on line 16 16, Fig. 15, on reduced scale.

Formed as an upward extension or continuation of the top passage-way, 32, is a separating-chamber, 38, its top curved, as shown in Fig. 6, by appropriate shading, and in Fig. 7 in elevation, and provided with a discharge-pipe, 39. This separating-chamber is made comparatively large, so that the air and pulverized material will have an opportunity to circulate freely about in it, that the coarser portion may fall back into the chamber, while only the finer passes out through the discharge-pipe 39. To assist this action of the separating-chamber, I provide a partition, 40, Fig. 7, placed near the entrance to the discharge-pipe 39, so that the material as it passes up into the separating-chamber will be forced by the configuration of the top of the latter to pass through the partition and take a downward direction, whereupon the coarser parts of such material will fall and return under the partition, as indicated by the arrow, into the pulverizing-chamber, while the finer portion will be drawn out by the air-current through the pipe 39.

It will be noticed that the size of the top discharge-opening, 32, is very much larger relatively to the pulverizing-chamber than that shown in our former patents, said discharge-opening in this machine being in cross-section practically of the same length as the pulverizing-chamber and nearly two-thirds of its width, and we find by experiment that a top discharge-opening of approximately the relative size shown gives far better results than are obtained where it is considerably smaller. It appears that the material in the pulverizing-chamber, having attained a rapid rotary motion, is driven past the discharge-opening when the latter is relatively small without entering it, while when the opening is sufficiently large it is drawn up into it and out. It would also appear that the increased length of the discharge-opening affords an opportunity for the imperfectly-pulverized material to fall upon the upper portions of the inclined plates 13 14, and thus to receive the full centrifugal impulse of the beaters before passing again to the point where the reduction takes place.

We have found that good results are obtained when the upward opening is even as large as the maximum cross-section of the pulverizing-chamber; but the relative size of the opening shown is more convenient and gives equally good, and perhaps somewhat better, results. The large opening, when used in connection with the separating-chamber, also permits the upward current of air charged with the material under treatment in a more or less pulverized condition to circulate freely, and to some extent to return upon itself without passing over the screen, so that the coarser particles fall back directly into the pulverizing-chamber. We suppose that there are two continuous streams of the coarser material diverging from the center of the pulverizing and the separating chambers, curving over sidewise and passing down the end walls to the beaters, as indicated in Fig. 5. These currents carry back the coarse materials to be further comminuted. This is impossible where the separating-chamber, or the opening between it and the pulverizing-chamber, is of relatively small dimensions. On the contrary, the coarse particles are effectually prevented in this case from returning by the pressure in the narrow throat, and some such device as the automatic-valve arrangement of our former patents is necessitated, which, however, is not satisfactory in operation. The material to be pulverized is introduced through a hopper, 41, placed on one side of chamber 38, its opening being near the bottom of the latter. The feed of the material is insured and regulated by a bladed roller, 42, journaled in the hopper and intermittently rotated by a shaft, 43, journaled in the bearings 44 45, attached to the outside of the separating-chamber, the shaft 43 being connected by bevel-gearing with the shaft of the bladed feed-roller and having on its other extremity a pawl-and-ratchet connection with a rod, 46, eccentrically pivoted at its upper end to a pulley, 47, geared to any suitable source of motive power. The pawl-and-ratchet connection referred to consists of a ratchet-wheel, 48, rigidly attached to the shaft 43, and an arm, 49, pivoted thereon and carrying a pawl, 50, the other end of arm 49 being connected with rod 46 by a pin, 51, a number of holes being provided in the end of arm 49 for this pin, whereby the amount of motion of the pawl 50 may be regulated so as to give a more or less extensive rotary motion to the feed-roller on each reciprocation of the arm 49, and thus the raw material is pushed into the pulverizing-chamber more or less rapidly. This pawl-and-ratchet movement is more readily adjusted and on the whole more convenient than a gearing-down connection between the source of power and the feed-roller, though such a connection might be used. The material is prevented from falling freely into the pulverizing-chamber by a movable bottom, 52, pivoted in the hopper at 53, and provided with a counterbalance-weight, 54, rigidly attached to it, the movable bottom resting against the blades of the feed-roller or bearing on other bearing-surfaces or shoulders formed on the sides of the hopper. This bottom is forced down by the blades of the feed-wheel, as the latter drives on the coarse material, sufficiently to permit a proper feed.

Features of our improved machine to which we desire to call attention are the absolute distance between the contiguous faces of the oppositely-revolving beaters and also that distance relative to the total length of the machine. We find that increase of the space between the beaters tends to increase the fineness of the resulting product. The best average results are obtained with a space which bears the proportion of one to three to the total length of the pulverizing-chamber, and which with machines of ordinary size is about ten to twelve inches. While, however, the proportion above indicated of one to three is that which we believe to be the best, yet, if the absolute distance of ten to twelve inches between the beaters be preserved the relative length of the chamber may be varied considerably without very greatly affecting the operation of the machine. It appears, therefore, that the absolute distance between the beaters is of more importance than that distance relative to the length of the chamber. If this space is narrower the machine will do less work. The difference is probably due to the fact that the rapid rotation of the beaters produces a partial central vacuum within and between the beaters, toward which the air and the material under treatment rush in around the beaters and through the clear space between them. If this space is narrow the material is prevented from free access to the central vacuum space and the work done by the machine is below its maximum capacity; but when the space between the sets of beaters is large enough to permit free movement of the material as it is drawn toward the central vacuum the maximum capacity of the machine will be attained. This broad space also permits the formation of eddying currents, the tendency of which is to further comminute the material.

Where the machine is used for coarse grinding, we find it desirable to introduce oblique guide-surfaces 74 (shown in broken lines in Figs. 1 and 5 and in full shading lines in Fig. 4) to protect the shaft, hubs, and arms of the beaters from the impact of the falling fragments, since if they are permitted to strike those parts they rapidly wear them away. These inclined surfaces 74 are formed by the use of blocks. (Illustrated in section in Fig. 11.) Where the grinding is fine it is better to allow the descending dust to pass into the current of air driven forward by the beaters, as above explained, dispensing with the converging guide-surfaces.

Besides the improvements in the construction of the pulverizer itself herein described we have made improvements in the method of using the machine, which will now be described. Where fresh air is continually drawn into the pulverizer and the air which has been separated from the dust formed by it is allowed to escape freely, there will always be more or less waste of material carried out from the machine by the escaping air, and the operation of the machine will be more or less irregular, owing to variations in the supply of air to the machine.

We propose to continuously use practically the same body of air with the machine, freeing it more or less perfectly from dust after it passes out of the pulverizing-chamber, and then drawing it back into the pulverizing-chamber for further use. We thus avoid all waste of the material operated upon, and we also obtain a constant and uniform quantity of air in the machine and its connections. After leaving the machine and passing through the discharge-pipe 39, the air enters a series of settling-drums, 55 56, provided preferably with partitions of usual construction, 57 58, for checking the air-current and connected by discharge-pipes 59 and 60, provided with weighted valves 75 and 76, with runway 61, through which the dust is forced by a screw conveyer, 62, to a discharge-pipe, 63, entrance to which is controlled by a weighted valve, 64. From the last settling-drum 56 the air passes through a pipe, 65, to a suction-fan, 66, whence it is delivered into another settling-chamber, 67, provided with partitions 68 and connected at its other end by the pipe 69 with the air-pipe 22 23 of the pulverizer. The top of this settling-chamber 67 is formed of a considerable length of tolerably-close canvas stretched over a frame-work formed of two sets of parallel strips, 70 and 71, arranged alternately with respect to each other and some little distance apart, so that the air in the settling-chamber 67 has free access to all parts of the canvas except such as are in immediate contact with the strips. This canvas acts as an equalizing-valve with respect to the air in the system of pipes and chambers, permitting air to slowly enter when too little is in the system and to slowly pass out when too much has been drawn in, and at the same time arresting any dust which would otherwise pass out with the air. For further regulating the suction of the fan 66 upon the settling-chambers 55 and 56 a valve, 72, is provided in pipe 65, and to regulate the suction of the beaters in the pulverizing-chamber upon the air in the settling-chamber 67 a valve, 73, is provided in pipe 69.

A further advantage of the equalizing-valve is that it prevents an overcharge of air in the machine from forcing dust out through cracks and crevices in any part of the machine into the outer air—an inconvenience which is often attendant upon the use of reducing-machines and is often highly detrimental to the health of the operators. To enable the operation of the equalizing-valve to be thoroughly understood, it may be necessary to go somewhat more into detail in the explanation of the principle of its operation. Let us suppose, first, that the pulverizer is used without the exhaust-fan and without the returning air-pipe, air being simply drawn into the pulverizing-chamber through the end holes provided in the machine formerly patented to us, and allowed to escape into the outer air after passing through the settling-drums. In this case the beaters, operating as fans to produce a strong draft, force the air in a powerful current up through the separating-chamber and giving it a tendency to escape whenever there may be an imperfect joint or a gap in the walls of any part of the machine. As the dust is exceedingly fine, and it is practically impossible to make a machine absolutely impervious at all points to it, it is found that more or less dust is usually given off into the room in which the machine is situated, with its attendant inconveniences and dangers. Now if, to a machine so placed, an exhaust-fan is applied on the farther side of the settling-chambers, the tendency of the dust to escape from the machine itself will be reduced, as all the pulverized material will be given a greatly-increased tendency to pass up through the discharge openings and pipes and into the settling-chamber; but at the same time a greater amount of the material will be drawn through the settling-chambers, pass into the outer air, and be wasted. If, now, in order to prevent this waste, the air-pipe is extended from the exhaust-fan back to the pulverizing-machine without an equalizing-valve, the difficulty experienced in the first case supposed is again felt, but in an exaggerated degree, for one of two conditions must exist—either the entire system of air-passage-way chamber is altogether air-tight and the amount of air contained in it therefore absolutely constant, or, as is much more probable, there are a number of opportunities in various parts of the machine and connections for air to pass in and out. Such opportunities are in fact necessary if the machine is to be run at varying speeds or with widely-different kinds of material, that the quantity of air used may be adapted both to the speed of the machine and the character of the material undergoing treatment. If such opportunities for the egress and ingress of air exist they are apt to be irregular and uncertain in their action, giving at times a surplus and at times a deficit of air. Under both conditions the machine will operate with less than its normal capacity and effectiveness, both as to quantity and quality of work done, and where there is an excess of air there will be even a greater tendency to force the finer dust out into the air about the machine than is observed where no exhaust-fan is used. The equalizing-valve, however, overcomes both these difficulties by causing the machine to automatically regulate, in a steady and reliable manner, its supply of air in accordance with its varying requirements, and altogether preventing the tendency referred to—to force out the finer dust from the machine. While other relative positions of the equalizing-valve and the exhaust-fan might perhaps be devised, it is obvious that the position shown—viz., that wherein the equalizing-valve stands in the return-pipe between the fan and the pulverizing-chamber—has advantages in that, first, it throws the suction of the fan to the fullest extent upon the pulverizing-chamber, and, second, enables the action of the equalizing-valve to be felt directly at the entrance to the pulverizing-chamber, where it will be most directly and immediately effective upon and governed by the operating parts of the machine. Many other forms of this equalizing-valve might undoubtedly be readily devised.

Having thus described our invention, what we claim, and desire to protect by Letters Patent of the United States, is—

1. In a reducing-machine, the combination of a circular chamber, two sets of beaters placed one in each end of said chamber, and means for causing said beaters to revolve, the said beaters having between their inner revolving edges a clear space of a width equal approximately to one-third the length of the chamber, and the said chamber being provided with an upward discharge-opening substantially equal in length to the length of the chamber, substantially as described.

2. In a reducing-machine, the combination of a circular elongated pulverizing-chamber, two sets of beaters, one placed in each end, said beaters having a clear space between their revolving faces, means for causing said beaters to revolve, said chamber having an upward discharge-opening approximately equal in length to the chamber itself, and a separating-chamber forming an upward continuation of said discharge-opening, substantially as described.

3. In a reducing-machine, the combination of a circular elongated chamber, beaters placed therein, means for causing said beaters to revolve, said chamber being provided with an upward discharge-opening, a separating-chamber, a discharge-pipe therefrom, and a partial partition located in said separating-chamber between the said upward opening from the chamber containing the beaters and the entrance to the said discharge-pipe, substantially as described.

4. In a reducing-machine, the combination of a pulverizing-chamber, rotatable beaters mounted therein, a separating-chamber connected therewith and having a curved top and a discharge-pipe leading from a point below the top of said separating-chamber, and a partition located within the separating-chamber in front of the discharge-orifice and above the bottom of the separating-chamber, substantially as described.

5. In a reducing-machine, the combination of a circular chamber having a larger diameter at its center than at its ends, two sets of beaters arranged one in each end of said chamber, and means for causing said beaters to revolve, said circular chamber having an upward discharge-opening of approximately the length of the chamber itself and of a width approximately equal to two-thirds of its largest diameter, substantially as described.

6. In a reducing-machine, the combination of a circular chamber having a larger diameter at its center than at its ends and provided with an upward discharge-opening, two sets of oppositely-revolving beaters, one set placed in each end of said chamber, means for causing said beaters to revolve, and two air-pipes leading into said circular chamber at its base, one at each end thereof and on opposite sides of the axes of the shafts with respect to each other, substantially as described.

7. In a reducing-machine, the combination of a circular elongated pulverizing-chamber, two sets of beaters placed one in each end of said chamber, means for causing said beaters to revolve, and two air-pipes approaching the chamber from the same side and entering the chamber one at each end, with a downward turn and on opposite sides of the longitudinal axis thereof, substantially as described.

8. In a reducing-machine, the combination of a circular elongated chamber having a larger diameter at its center than at its ends, two sets of beaters, one placed in each end, means for causing said beaters to revolve, said circular chamber being provided with an upward discharge-opening substantially equal in length to the chamber itself, and guide-blocks attached one to each end wall of the said upward discharge-opening, extending upwardly and inclined outwardly, whereby partially-pulverized material, returning by gravity to the discharge-opening, is deflected toward the center of the same, substantially as described.

9. In a reducing-machine, the combination of an elongated circular chamber, 5, provided with central annular circumferential chamber, 24, removable grate-bars 25, placed between said chambers, and adjustable lining-plates 33 and 34, substantially as described.

10. In a reducing-machine, the combination of a pulverizing-chamber having a wide central upward discharge-opening and rotatable beaters mounted therein, with a separating-chamber placed over the discharge-opening and extending beyond the two lateral sides of the same, deflecting-plates extending each from one side of the discharge-opening to the corresponding side of the separating-chamber, and a discharge-pipe from the separating-chamber, substantially as described.

11. In a reducing-machine, the combination of a pulverizing-chamber having a central upward discharge-opening and rotatable beaters mounted therein, and a separating-chamber placed over the opening and extending beyond the two sides of the same, closed at its upper end by a curved top, with deflecting-plates extending from the lateral edges of the discharge-opening to the corresponding walls of the separating-chamber, a discharge-pipe communicating with one side of the separating-chamber, and a partition within the separating-chamber in front of the opening to the discharge-pipe, substantially as described.

12. In a reducing-machine, the combination of a pulverizing-chamber having a central upward discharge-opening, and a separating-chamber extending beyond the two sides of the opening, and rotatable beaters mounted therein placed upon the same, with a discharge-pipe extending from one side of the reducing-chamber, and a partition before the entrance of the discharge-pipe and to one side of the discharge-opening, leaving a free space above its upper edge for the passage of the reduced material to the discharge-pipe and a free space below its lower edge for the return of coarse particles to the discharge-opening, substantially as described.

GEORGE RAYMOND.
ALBERT RAYMOND.

Witnesses:
FREDERICK C. GOODWIN,
E. L. HUBER.